E. J. R. BEATTEY.
EYEGLASS MOUNTING.
APPLICATION FILED NOV. 23, 1916.
1,240,533.
Patented Sept. 18, 1917.
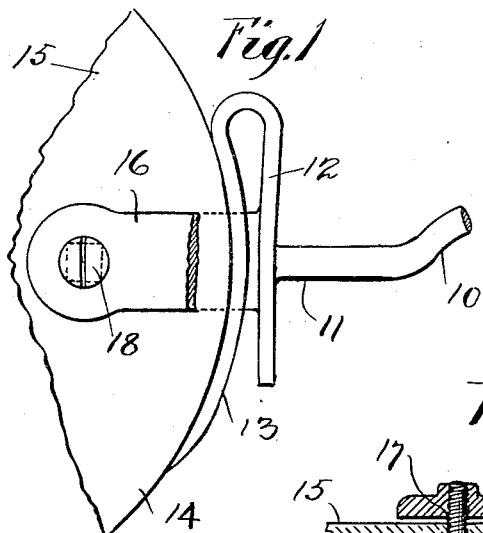
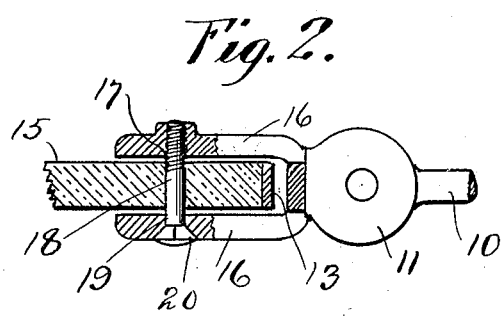
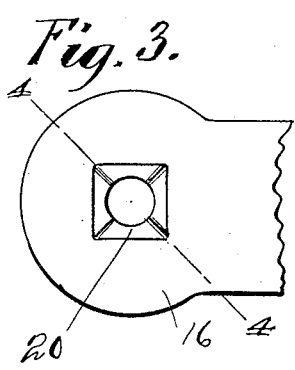
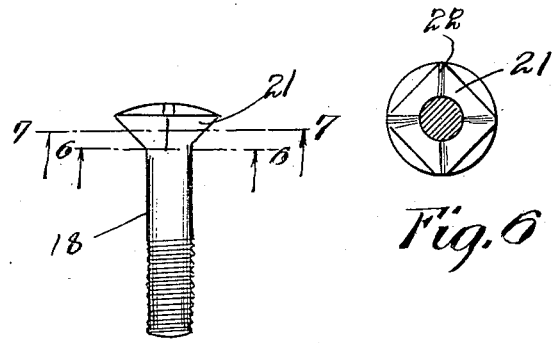
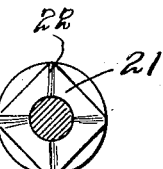
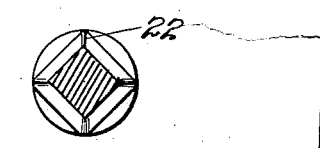
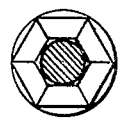
Witnesses
J. R. Bickford
O. F. Macready
Inventor
Earle J. R. Beattey
By
Howard E. Barlow
Attorney

UNITED STATES PATENT OFFICE.

EARLE J. R. BEATTEY, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

EYEGLASS-MOUNTING.

1,240,533.   Specification of Letters Patent.   Patented Sept. 18, 1917.

Application filed November 23, 1916. Serial No. 132,951.

*To all whom it may concern:*

Be it known that I, EARLE J. R. BEATTEY, a citizen of the United States, and resident of the city of Providence, in the county of Providence and State of Rhode Island, have invented certain new and useful Improvements in Eyeglass-Mountings, of which the following is a specification.

This invention relates to eyeglass mountings, and has for its object to provide a mounting of this character having means for locking each lens screw in its clamp so as to prevent this screw from working loose by the movements of the lens upon it.

With this and other objects in view, the invention consists of certain novel features of construction, as will be more fully described, and particularly pointed out in the appended claims.

In the accompanying drawings:

Figure 1— is a side elevation of an eyeglass mounting wherein the lens is supported on the spring tongue, coöperating means being provided in both the lens clamp and the screw for securing the latter in the clamp.

Fig. 2— is an edge view of an eyeglass mounting partly in section illustrating my improved means for locking the screw therein.

Fig. 3— is a greatly enlarged face view of one of the clamp members showing the squared tapering hole for the reception of the screw head in one of the lens straps.

Fig. 4— is an edge view of the lens strap sectioned on line 4—4 of Fig. 3.

Fig. 5— is an elevation of the screw showing its special form of locking head.

Fig. 6— is a section on line 6—6 of Fig. 5 through the lens screw looking in the direction of the arrow.

Fig. 7— is a section on line 7—7 of Fig. 5 looking in the direction of the arrow showing the square shape of the beveled portion of the head.

Fig. 8— is a sectional view similar to that shown in Fig. 7 but wherein the beveled portion of the screw head is shown as being of hexagon shape instead of square.

Referring to the drawings, 10 designates the nose bridge portion of the mounting and 11 the lug of the bridge which is attached to the saddle portion 12, which saddle portion in Fig. 1 is illustrated as having a downwardly extending spring tongue 13 which bears against the edge 14 of the lens 15. This lens is shown as being mounted between the two lens clamps 16, as illustrated in Fig. 2. One of these clamps is tapped as at 17 for the reception of the threaded end of the screw 18 while the other of these straps is provided with a hole 19 whose outer end is tapered as at 20, see Fig. 4, and which tapering portion in some cases is formed square as best illustrated in Fig. 3.

When this tapered portion of the hole in the lens clamp is formed square, I preferably provide the tapered portion 21 of the head of the screw 18 correspondingly tapering and correspondingly squared in cross section as best illustrated in Figs. 6 and 7.

The space between the lens clamps in most mountings is a little greater than the width of the lens set therein and in this particular spring tongue mounting, it is desired to leave a little space between the clamps and the lens to permit of a free action of this spring tongue, therefore in applying my improved form of lens screw to its seat, the clamps yield inwardly slightly and permit the corners 22 of the screw to pass the flattened sides of the tapered portion of this hole, thus preventing the screws from ever becoming accidentally backed out or loosened from its position, without the application of considerable power through the use of a screw driver, at the same time permitting the desired looseness of the lens between its clamping members.

I do not wish to be restricted to the forming of the tapered portion of the head of my locking screw, in the form of a square, as this head and its corresponding hole in the clamp member may be made hexagonal, octagonal or of any many sided figure having a plurality of angular faces.

It is found in practice by providing a space between the arms 16 normally greater than the thickness of the lens 14 that the latter is left free to rotate on its screw 18 and to return to its normal axial alinement against its seat under action of the spring 13, and by making the lens engaging arms 16 resilient, angular locking means for the screw may be employed. Another advantage of this construction is that by yieldingly retaining the lens, breakage is prevented both when the glasses fall and from uneven expansion of the arms and lens.

I have shown and described one illustrative embodiment of my invention but I desire it to be understood that although specific terms are employed they are not for the purpose of limitation, the scope of the invention being defined by the appended claims.

I claim:

1. An eye-glass mounting comprising the lens clamp having spaced apart arms normally separated by a distance greater than the thickness of the lens, a screw connecting said arms, said screw and one of said arms having complemental means for normally preventing rotation of the screw, said arms being sufficiently resilient to permit them to be pressed toward each other, whereby the screw may be disengaged from its rotation-preventing means to permit rotation thereof, a lens seat on one side of the axis of said screw, and resilient means on the opposite side of the axis of the screw for maintaining a tension upon the lens to press the latter against said seat.

2. An eye-glass mounting comprising a lens clamp having spaced apart arms normally separated by a distance greater than the thickness of the lens, a screw passed through and connecting said arms, said screw having angular locking faces, one of said arms having angular locking faces complemental to those of the screw to normally prevent rotation of the latter, said arms being sufficiently resilient to permit them to be pressed toward each other, whereby said complemental locking faces may be disengaged to permit rotation of the screw, a lens seat on one side of the axis of said screw, and resilient means on the opposite side of the axis of the screw for maintaining a tension upon the lens to press the latter against said seat.

3. In an eye-glass the combination with a lens, of a clamp having spaced apart arms normally separated by a distance greater than the thickness of said lens, a screw supported by said arms and extended through the lens to provide a pivot therefor, said screw and one of said arms having complemental means for normally preventing rotation of the screw, said arms being sufficiently resilient to permit them to be pressed toward each other, whereby the screw may be disengaged from its rotation-preventing means to permit rotation thereof, a lens seat above said pivot screw, and resilient means below said pivot screw for applying a rotation tension to the lens to yieldably press it to said seat.

In testimony whereof I affix my signature in presence of a witness.

EARLE J. R. BEATTEY.

Witness:
Howard E. Barlow.

Copies of this patent may be obtained for five cents each, by addressing the "Commissioner of Patents, Washington, D. C."